May 17, 1966  K. J. BRADY  3,251,199
DETACHABLE SUPPORT FOR ROTARY MEMBERS
Filed Nov. 7, 1963
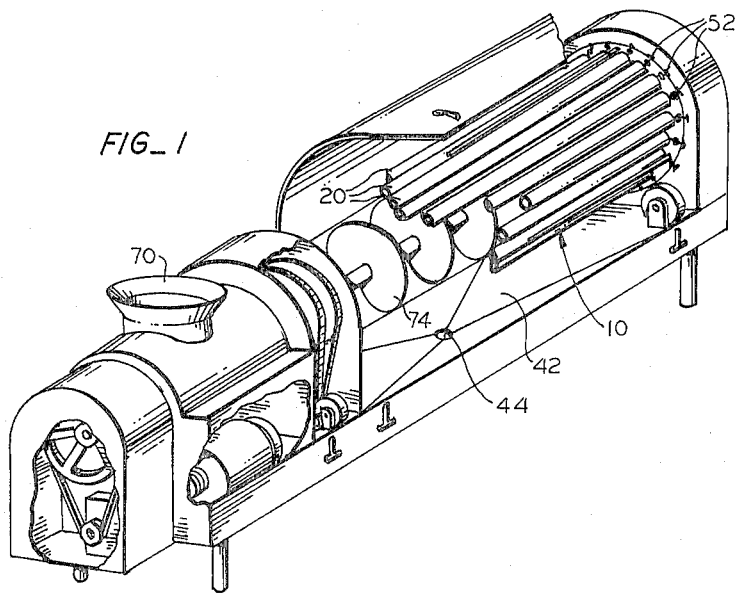
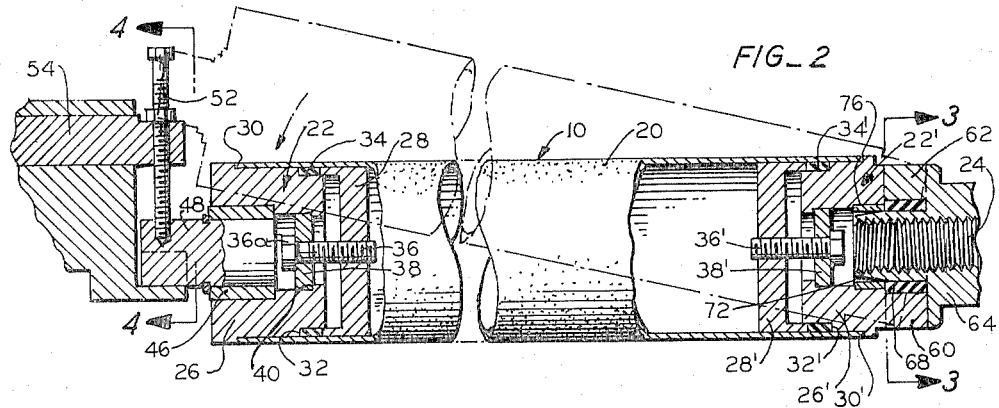
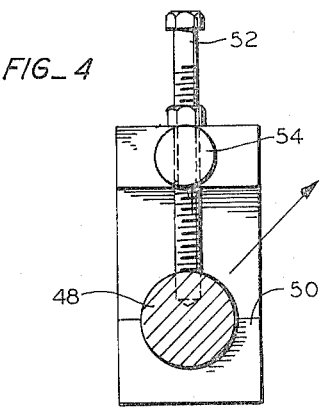
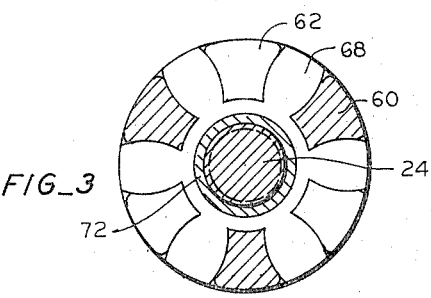
INVENTOR.
KENNETH JOHN BRADY
BY
Paul B. Fihe
PATENT AGENT United States Patent Office 3,251,199
Patented May 17, 1966

3,251,199
DETACHABLE SUPPORT FOR ROTARY
MEMBERS
Kenneth John Brady, Milpitas, Calif., assignor to Eggo Food Products, Inc., San Jose, Calif., a corporation of California
Filed Nov. 7, 1963, Ser. No. 322,086
4 Claims. (Cl. 64—1)

The present invention generally relates to supporting structures for rotary members and more particularly to a detachable support or mounting arrangement for rotary shafts or the like which must be frequently replaced because of their particular manner of utilization.

One application to which the present invention is admirably suited exists in an apparatus for peeling fruits or vegetables as described in detail in patent application Serial Number 167,127, now Patent No. 3,134,413, wherein potatoes or other fruits or vegetables are peeled by exposure to a plurality of rotary abrasive shafts. Under continued use, the abrasive surfaces of such shafts deteriorate and accordingly the effectiveness of their peeling function is reduced. Additionally, the shafts are not only exposed to the contact with the potatoes themselves but also to water in the form of a washing spray that further accelerates the deterioration of the abrasive shafts.

In all prior devices known to the present applicant, the time for replacement of the abrasive shafts or other members has been relatively great so that a substantial decrease in overall production rate of the peeling apparatus has been experienced, and, in addition, the removed rotary element was considered as an expendable element thereby indirectly increasing production costs.

Accordingly, it is a general object of the present invention to provide a detachable supporting arrangement for rotary members, such as rotary abrasive shafts, which facilitates the replacement activity and furthermore enables repair and re-utilization of the replaced element.

More particularly, it is a feature of the invention to provide a support arrangement for a rotary member that enables generally lateral insertion or removal of the rotary member.

Additionally, it is a feature of the invention to provide a rotary member of elongated tubular configuration to the opposite extremities of which mounting members can be releasably connected.

A related feature of the invention is the incorporation of a sealing mechanism in the connections between said mounting members and the tubular rotary member to preclude the entry of water or other contaminating material.

Another feature of the invention is the provision of a drive connection to the mounting member at one end of the assembled structure which allows the rotary member a limited degree of angular displacement enabling the aforementioned lateral removal of the unit but which at the same time assures axial alignment between the driving and driven members during operation.

Additionally, it is a feature of the invention to provide a quick-disconnect arrangement for mounting the idler end of the rotary member in precise axial alignment with the driven end thereof.

These as well as other objects and features of the invention will become more apparent from a perusal of the following description of the exemplary structure shown in the accompanying drawing wherein:

FIG. 1 is a perspective view of an entire peeling apparatus incorporating supports for rotary abrasive shafts embodying the present invention, portions of the structure being broken away to illustrate interior details, FIG. 2 is an enlarged, fragmentary, longitudinal, sectional view through one of the abrasive shafts and illustrating the supporting structure therefor, FIG. 3 is an enlarged, transverse, sectional view taken along line 3—3 of FIG. 2 and illustrating details of the drive connection to the rotary shaft, and FIG. 4 is an enlarged, sectional view taken along line 4—4 of FIG. 2 and illustrating the mounting arrangement at the idler end of the structure.

With initial reference to FIG. 1, a peeling apparatus is illustrated substantially as shown and described in patent application Serial Number 167,127 to which reference is made for details of both structure and operation. Generally, potatoes or other fruit or vegetable to be peeled is introduced through a hopper 70 adjacent the left end of the structure into engagement with a screw conveyor 74 which is suitably driven to move the mass of potatoes to the right while simultaneously effecting a tumbling action thereof so that the individual potatoes are brought into contact with abrasive surfaces provided on a rotary drum, indicated generally at 10, and more particularly consisting of a plurality of abrasive shafts 20. The entire drum 10 composed of the abrasive shafts 20 is arranged for rotation and the individual shafts 20 themselves also are individually rotatable about their own axes. As explained in detail in the aforementioned patent application, an effective peeling action is obtained. The peeled potatoes are exhausted from the right-hand end of the unit while the abraded material is flushed with water suitably supplied in a spray downwardly into a trough 42 and thence through a central drain opening 44.

The abrasive surface of the shafts 20 gradually deteriorates during continued utilization of the unit so that replacement is required. In accordance with this requirement the present invention provides a detachable support for each of the shafts in accordance with the recited objects and features of the present invention.

More particularly, each shaft 20 is formed by an elongated hollow tubular member arranged to receive at its opposite extremities first and second mounting members 22, 22' having structurally similar characteristics. The first mounting member 22, as shown to the left in FIG. 2, provides support of this end of the shaft 20 for free rotation while the second mounting member 22', as shown to the right of FIG. 2, incorporates a coupling means permitting connection to drive shaft 24, as will be described in detail hereinafter.

The two mounting members 22, 22' are generally similar in construction, as has been mentioned hereinabove, so that corresponding portions thereof will be differentiated merely by addition of a prime notation. Each mounting member 22 includes a generally cylindrical body arranged for entry into the respective end of the tubular shaft 20 and composed of two axially movable sections 26, 28. One section 26 is generally tubular having an axially stepped exterior surface forming two shoulders 30, 32 adjacent opposite ends thereof. The central portion of this tubular section 26 is arranged for slideable insertion into the end of the tubular shaft 20 whose extremity is brought into abutting engagement with the shoulder 30 at one end of the structure. The intended portion of this tubular section 26 adjacent the other shoulder 32 receives a flat resilient ring 34 arranged to establish tight connection with the encompassing tubular shaft 20.

To establish such connection, the second section 28 of the mounting member 22 constitutes a generally cup-shaped element whose exterior diameter is such that it is also slidably received within the tubular shaft 20 and the lip of the cup is arranged to enter the indentation at the one extremity of the first section so as to engage the resilient ring 34 positioned therewithin. The central portion of the second section 28 is threaded for reception of a bolt 36 whose head portion 36a engages a hardened washer 38 seated against a shoulder 40 in the first section 26 so that upon tightening of such bolt, the two sections 26, 28 are urged toward one another to effect axial compression of the resilient ring 34 and radial expansion thereof into tight sealing engagement with the encompassing tubular shaft 20. In this fashion, not only is a drive connection established between the mounting member 22 and the shaft 20 thereon but an effective fluid seal is also established to prevent the entry of water into the interior of the tubular shaft.

The first mounting member 22 at the left end of the structure as shown in FIG. 2 is, as previously mentioned, mounted for free rotation. For this purpose, the central portion of the first section 26 thereof mounts a bearing 46 in axial alignment with the shaft 20 and the bearing, in turn, rotatably support a pin or stub shaft 48 which projects from the end thereof for reception in a semi-cylindrical socket 50 on the machine frame, such socket being opened radially outward relative to the rotary peeling drum 10, as hereinabove defined. Such pin 48 is releaseably secured within the semi-cylindrical socket 50 by a bolt 52 that passes through a threaded bore in rotatable bracket 54 to enter its extremity in a radial bore in the described pin. When such bolt 52 is loosened, the bracket may be rotated so as to allow the pin 48 to be removed laterally from the semi-cylindrical socket 50 in the direction indicated by the arrow in FIG. 4, and the entire shaft 20 to be angularly displaced from its mounted arrangement, in the fashion illustrated in phantom lines in FIG. 2. Such angular displacement of the entire shaft 20 is permitted by the particular form of drive connection provided at the remote end of the shaft as shown to the right in FIG. 2

The right hand mounting member 22' is essentially the same as that on the left but for purposes of the establishment of driving connection to the shaft 20 includes three circumferentially-spaced axially projecting dogs 60 which are adapted for interdigital entry between three similar dogs 62 on a drive member 64 suitably secured to a rotary drive shaft 24. To enable flexibility of such drive connection a rubber spider 68 is interposed between the interdigitating dogs of the drive and driven elements, as most clearly illustrated in FIG. 3, such flexible coupling structure being substantially as shown in Patent Number 2,161,273 forming, in and of itself, no part of the present invention.

However, in accordance with an additional aspect of the present invention, a tapered sleeve 72 is secured to the extremity of the drive shaft 24 and projects into a bushing 76 mounted on the interior of the right hand mounting member 22', as shown in FIG. 2. When the connection is fully established as shown in full lines in FIG. 2, the bushing 76 engages exterior surface of the tapered sleeve 72 so as to maintain precise alignment between the abrasive shaft 20 and the drive shaft 24. However, when the remote or idler end of the shaft 20 is loosened and pivoted toward the phantom-line disposition as shown in FIG. 2, the flexible coupling and the tapered sleeve 72 at the drive end of the structure permit such angular displacement to take place. Obviously, after the idler end of the structure has been detached and angularly displaced, the drive connection can also be displaced by a slight axial pull on the entire abrasive shaft 20.

After the entire unit has been removed in the fashion described, the two mounting members 22, 22' can be removed from their connections with the respective ends of the abrasive shaft by the mere loosening of the central bolts 36. The abrasive shaft 20 can then be processed to restore the requisite abrasive material on its outer surface. Thereafter, the mounting members 22, 22' can be easily and quickly attached to its ends and the entire structure replaced by a mere reversal of the described disassembly of the unit.

Various modifications and/or alterations can obviously be made without departing from the spirit of the invention and the foregoing description of one embodiment is to be considered as purely exemplary and not in a limiting sense. The scope of the invention is to be indicated only by reference to the appended claims.

What is claimed is:

1. A support arrangement for a rotary member which comprises first and second mounting members secured to opposite ends of the rotary member, laterally releasable support means supporting said fist mounting member for free rotation, a drive member having support means releasably supporting said second mounting member, flexible coupling means connecting said second mounting member and drive member, said support means and coupling means permitting angular and axial displacement of said rotary member.

2. A support arrangement for a rotary member according to claim 1 wherein said means supporting said first mounting member includes a semi-cylindrical socket aligned with the axis of rotation, and said first mounting member includes a relatively-rotatable pin arranged for lateral reception in said socket.

3. A support arrangement for a rotary member according to claim 2 which comprises means releasably holding said pin in said socket.

4. A support arrangement for a rotary member which comprises first and second mounting members secured to opposite ends of said rotary member, a laterally releasable support for said first mounting member, and an axially-releasable support for said second mounting member, said axially-releasable support including a tapered pin enabling angular displacement of said second mounting member relative thereto, said axially-releasable support also including a flexible member connecting said second mounting member to a source of rotary power so as to permit angular displacement thereof.

References Cited by the Examiner

UNITED STATES PATENTS

| | | | |
|---|---|---|---|
| 1,512,872 | 10/1924 | Adkins et al. | 64—1 |
| 1,586,710 | 6/1926 | Scott | 308—20 |
| 1,812,538 | 6/1931 | Lockert et al. | 308—20 |
| 2,538,499 | 1/1951 | Benoit | 64—5 |
| 2,706,897 | 4/1955 | Holoye | 64—14 |
| 2,733,022 | 1/1956 | Grody | 242—72 |
| 2,909,046 | 10/1959 | Wheller | 64—10 |
| 2,986,021 | 5/1961 | Mottu et al. | 64—10 |
| 3,053,369 | 9/1962 | Klahn | 308—20 |

BROUGHTON G. DURHAM, *Primary Examiner.*

H. C. COE, *Assistant Examiner.*